(12) United States Patent
Krishnan et al.

(10) Patent No.: US 12,222,906 B2
(45) Date of Patent: Feb. 11, 2025

(54) INTELLIGENT FILE SYSTEM WITH TRANSPARENT STORAGE TIERING

(71) Applicant: Amazon Technologies, Inc., Seattle, WA (US)

(72) Inventors: Karthikeyan Krishnan, Sammamish, WA (US); Akshai Parthasarathy, Seattle, WA (US); Abdul Sathar Sait, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 151 days.

(21) Appl. No.: 18/186,089

(22) Filed: Mar. 17, 2023

(65) Prior Publication Data
US 2023/0229637 A1 Jul. 20, 2023

Related U.S. Application Data

(63) Continuation of application No. 17/187,480, filed on Feb. 26, 2021, now Pat. No. 11,609,884, which is a continuation of application No. 16/056,085, filed on Aug. 6, 2018, now Pat. No. 10,936,553, which is a continuation of application No. 15/595,838, filed on May 15, 2017, now Pat. No. 10,042,860, which is a continuation of application No. 14/570,930, filed on Dec. 15, 2014, now Pat. No. 9,652,471.

(51) Int. Cl.
*G06F 16/18* (2019.01)
*G06F 3/06* (2006.01)
*G06F 16/11* (2019.01)
*G06F 16/182* (2019.01)
*G06F 16/185* (2019.01)
*G06Q 20/10* (2012.01)

(52) U.S. Cl.
CPC ......... *G06F 16/183* (2019.01); *G06F 3/0611* (2013.01); *G06F 3/0643* (2013.01); *G06F 3/0647* (2013.01); *G06F 3/067* (2013.01); *G06F 16/122* (2019.01); *G06F 16/185* (2019.01); *G06Q 20/102* (2013.01)

(58) Field of Classification Search
CPC ............... G06Q 10/1053; G06N 20/00; G06F 16/24578; G06F 40/289; G06F 40/30
See application file for complete search history.

(56) References Cited

U.S. PATENT DOCUMENTS

| | | | |
|---|---|---|---|
| 7,225,211 | B1 | 5/2007 | Colgrove et al. |
| 8,706,701 | B1 | 4/2014 | Stefanov et al. |
| 8,706,755 | B2 | 4/2014 | Patel et al. |
| 8,762,456 | B1 | 6/2014 | Chan et al. |
| 8,799,413 | B2 | 8/2014 | Taylor et al. |

(Continued)

*Primary Examiner* — Truong V Vo
(74) *Attorney, Agent, or Firm* — Robert C. Kowert; Kowert, Hood, Munyon, Rankin & Goetzel, P.C.

(57) ABSTRACT

A file system manager implemented at a provider network identifies a storage device of a first group of storage devices of a provider network as an initial location of a file system object. Based on an access metric associated with the object, the file system manager initiates a transfer of contents of the object to a second storage device of a different storage device group, without receiving a client request specifying the transfer. In response to an access request received via a file system programmatic interface, contents of the object are provided from the second storage device. Based on a second access metric, the object is transferred back to the first group of storage devices.

20 Claims, 9 Drawing Sheets

(56) References Cited

U.S. PATENT DOCUMENTS

| | | | |
|---|---|---|---|
| 8,799,414 | B2 | 8/2014 | Taylor et al. |
| 9,652,471 | B1 | 5/2017 | Krishnan et al. |
| 9,940,377 | B1 | 4/2018 | Sait |
| 10,042,860 | B2 | 8/2018 | Krishnan et al. |
| 10,127,234 | B1 | 11/2018 | Krishnan et al. |
| 10,936,553 | B2 | 3/2021 | Krishnan et al. |
| 11,609,884 | B2 | 3/2023 | Krishman et al. |
| 2012/0246298 | A1 | 9/2012 | McGowan |
| 2013/0185530 | A1 | 7/2013 | Puttaswamy Naga et al. |
| 2013/0305039 | A1 | 11/2013 | Gauda |
| 2014/0068202 | A1 | 3/2014 | Goddard |
| 2014/0149461 | A1 | 5/2014 | Wijayaratne et al. |

INTELLIGENT FILE SYSTEM WITH TRANSPARENT STORAGE TIERING

This application is a continuation of U.S. patent application Ser. No. 17/187,480, filed Feb. 26, 2021, which is a continuation of U.S. patent application Ser. No. 16/056,085, filed Aug. 6, 2018, now U.S. Pat. No. 10,936,553, which is a continuation of U.S. patent application Ser. No. 15/595,838, filed May 15, 2017, now U.S. Pat. No. 10,042,860, which is a continuation of U.S. patent application Ser. No. 14/570,930, filed Dec. 15, 2014, now U.S. Pat. No. 9,652,471, which are hereby incorporated by reference herein in their entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine can be thought of as a software simulation acting as a distinct logical computing system that provides users with the illusion that they are the sole operators and administrators of a given hardware computing resource, while also providing application isolation among the various virtual machines.

In addition to providing virtualized compute servers, many network operators have implemented a variety of virtualized storage services with different types of access interfaces, different performance and cost profiles, and the like. For example, some storage services may offer block-level programmatic interfaces, while other storage services may enable clients to use HTTP (HyperText Transfer Protocol) or its variants to access storage objects. Some of the services may utilize primarily magnetic disk-based storage devices, while others may also or instead use solid-state drives (SSDs). Different levels of data durability, availability, and fault-tolerance may be achieved using different storage services. In at least some environments, however, a given file system accessible from a virtual compute server may be mapped to a single storage service at a time, and the file system's data may therefore be stored only on the types of storage devices used by that service. Such inflexible approaches to file system implementation may not enable file system users to benefit fully from the wide variety of storage-related capabilities that may be available in at least some provider network environments.

Figure 1:
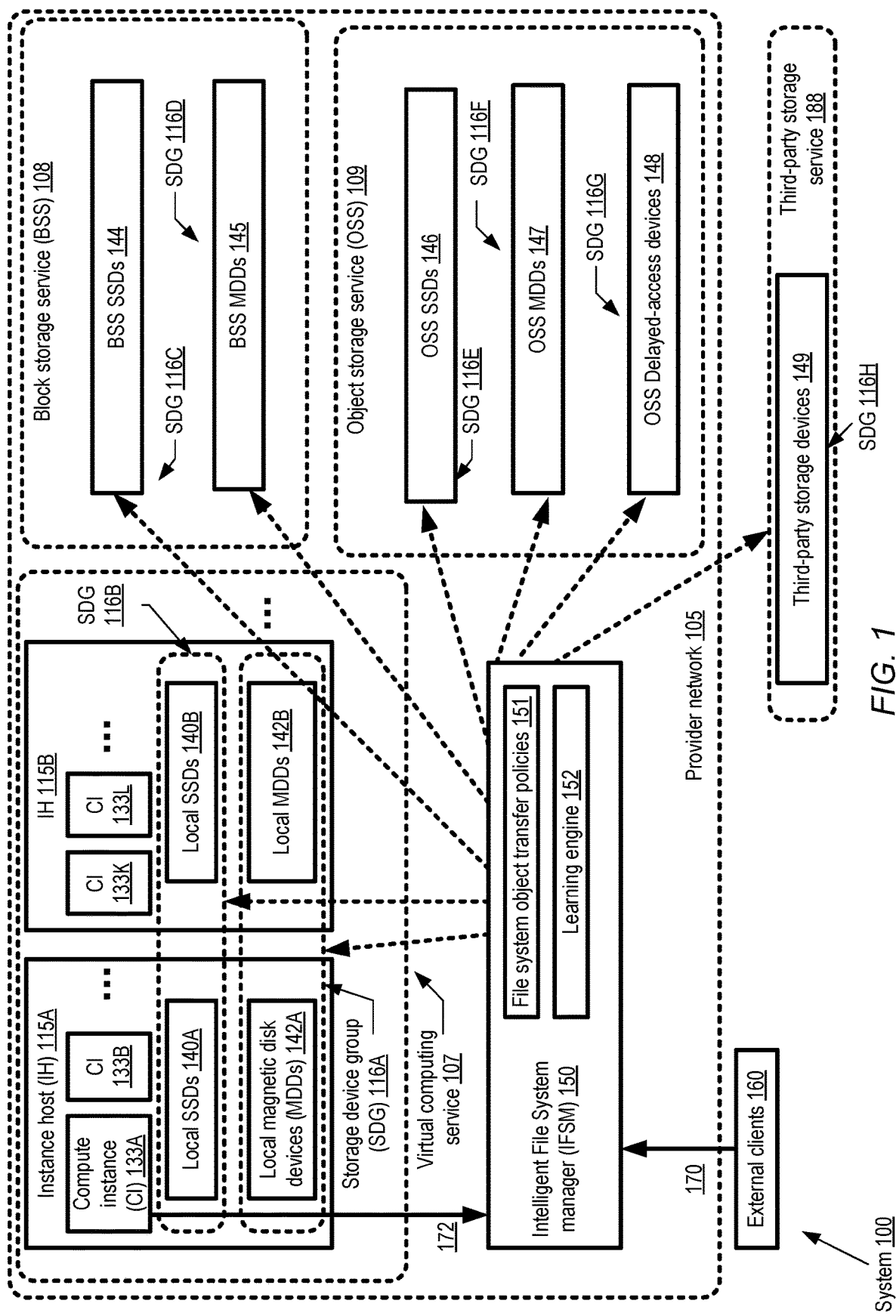
FIG. 1 illustrates an example system environment in which an intelligent file system which transparently and automatically transfers file object contents between different storage device groups may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing intelligent file systems at which file system object contents are transparently and automatically transferred between storage device groups in a provider network environment are described. Networks set up by an entity such as a company or a public sector organization to provide one or more services (such as various types of multi-tenant and/or single-tenant cloud-based computing or storage services) accessible via the Internet and/or other networks to a distributed set of clients or customers may be termed provider networks in this document. Provider networks may sometimes also be referred to as "public cloud" environments. The term "multi-tenant service" may be used herein to refer to a service that is designed to implement application and/or data virtualization in such a manner that different client entities are provided respective customizable, isolated views of the service, such that one client to whom portions of the service functionality are being provided using a given set of underlying resources may not be aware that the set of resources is also being used for other clients. For example, a multi-tenant virtualized computing service (VCS) may instantiate several different guest virtual machines on behalf of respective clients at a given hardware server, without any of the clients being informed that the hardware server is being shared with other clients. Guest virtual machines may also be referred to as "compute instances" or simply as "instances" herein, and the hardware servers on which one or more instances are resident may be referred to as "virtualization hosts" or "instance hosts". A provider network may typically include several large data centers hosting various resource pools, such as collections of physical and/or virtualized computer servers, storage devices, networking equipment, security-related equipment and the like, needed to implement, configure and distribute the infrastructure and services offered by the provider.

In at least some embodiments, in addition to virtualized computing services, one or more multi-tenant storage services may also be implemented at a provider network. For example, one such service may provide "volumes" of storage accessible via block-level device interfaces from the compute instances of the VCS. Such a service may be referred to herein as a "block storage service" or BSS. Another storage service may offer support for unstructured storage objects of arbitrary size that can be accessed via web services interfaces (e.g., utilizing URIs (Universal Resource Identifiers) to identify the storage objects to be accessed). The latter type of service may be referred to herein as an object storage service (OSS). A number of different types of storage media may be used within such storage services—for example, the BSS may use solid state drives (SSDs) for some subsets of its data and rotating magnetic disk drives (MDDs) for other subsets of its data. The instance hosts at which the compute instances are run may have their own local storage devices as well, which may also include several different storage device types. In one embodiment, a provider network may also use a set of computer hosts in un-virtualized mode, in which for example only a single operating system is set up on the "bare-metal" (un-virtualized) components of a given host, without using virtualization management software (such as hypervisors) to configure multiple compute instances with respective operating systems. Storage devices (e.g., SSDs and/or MDDs) attached locally to such un-virtualized hosts may constitute one or more additional storage device types in such embodiments. It may also be feasible in some embodiments to access storage devices outside a given provider network from a compute instance—e.g., third-party storage services may provide access to storage devices of various kinds that are located at external data centers, or clients may at least in principle be able to access storage devices that are located within client-owned premises.

In at least some embodiments, therefore, from a given compute instance it may be possible to store data to, and access data from, a variety of different storage devices, which may be either locally attached or network-accessible. Each of the different groups of local and/or service-managed storage devices may offer respective levels of performance (e.g., read/write operation throughputs and latencies), availability, data durability, and/or pricing/billing policies in some embodiments. Thus, for example, while it may make sense from a performance or pricing perspective to store a storage object at one tier of storage devices (such as locally-attached SSDs) when the object is created and is therefore likely to be accessed fairly frequently, it may also make sense to transfer the object to less expensive storage as it ages and is accessed less frequently. However, at least in some provider network environments, any given file system may be tied closely to a particular storage device tier and/or to a particular storage service—e.g., it may only be possible to store files of the file system at a block-level storage service, or at locally-attached storage at the compute instances.

In some embodiments, a provider network operator may implement an intelligent file system framework that automatically and transparently transfers file system objects (such as files, directories, or entire file systems) between different storage device groups that are available, e.g., based on observed access metrics of the objects and various types of optimization criteria. From a typical user's perspective, a particular intelligent file system may appear to be similar to conventional file systems in some embodiments. For example, if a Linux-based or Unix™-based operating system is in use at a given compute instances, the same types of programmatic interfaces—e.g., commands like "mkfs" to create the file system, "mount" to attach to the file system, or "ls" to list contents of a directory—may be used to interact with an instance of an intelligent file system as would be used for other file systems. Some additional command parameters specific to intelligent file systems may be supported in various implementations as described below in further detail. Under the covers, however, the intelligent file system's control-plane or administrative components may gather statistics about the usage of various files or directories, and move the contents of such objects among different storage device groups based at least in part in such statistics, without receiving any explicit requests from clients. The administrative components of the intelligent file system implementation, which may be referred to herein as the intelligent file system manager (IFSM), may be distributed across various software and/or hardware entities of the provider network in at least some embodiments. For example, some components of the IFSM may be incorporated within the operating systems of the compute instances, others may be implemented at a virtualization software stack at the instance hosts of the VCS, others may be included within the control planes of the different storage services, and/or at other servers or devices that are dedicated exclusively to administering the intelligent file systems.

In one embodiment, the IFSM may support at least two accessibility modes for a given file system created on behalf of a client: a private accessibility mode, in which file system objects are to be accessed from a single compute instance, and one or more shared accessibility modes, in which objects of a given file system are to be accessed from multiple compute instances. In some embodiments, the shared accessibility mode may in turn comprise additional sub-categories, such as clustered versus non-clustered shared file systems as described below. In various embodiments, software containers representing an additional layer of abstraction on top of compute instances (or on top of un-virtualized hosts' operating systems) may be implemented at a provider network. Thus, for example, a single compute instance may be used for multiple software containers, where each container represents a logically isolated execution environment, to be used for a set of applications that are to run independently of other applications in different containers of the same compute instance. Each container may have its own process trees, user identifiers, mounted file systems and the like, which may not be visible from other containers. Software containers (implemented within a given compute instance, an un-virtualized host's operating system, or spread across multiple instances or hosts) may also be provided access to file systems managed by the IFSM in some such embodiments. In different implementations, such container-based access may be considered a distinct accessibility mode by the IFSM, or may be regarded as a sub-category of one (or more) of the other accessibility modes. Clients may indicate the accessibility mode they want for a particular file system as a parameter of a file system creation request in various embodiments. In at least one implementation, the IFSM may assign a default accessibility mode to a file system, e.g., if the client on whose behalf a file system is being created does not indicate a desired accessibility mode. The decisions regarding the storage device group (or groups) at which a given file system object's contents are to be stored initially (i.e., when the object is populated with its first set of data), may be made based at least in part on the accessibility mode of the corresponding file system. For example, in one embodiment, if an intelligent file system IFS1 has been created in private accessibility mode such that the files of IFS1 can be accessed from a compute instance CI1 running an instance host IH1, the contents of a given file F1 of IFS1 may initially be stored at locally-attached SSD-based storage of IH1. In some embodiments, the contents of F1 may also be stored or replicated at SSDs of a block-level storage service, so that for example F1 is not lost if the compute instance CI1 is terminated or if a failure occurs at IH1. If F1 were instead created within a different file system IFS2 in shared mode, the contents of F1 may initially be stored at one or more SSD or magnetic disk-based devices of a cluster CLI of devices designated for IFS2 in some embodiments, where CLI is accessible from numerous CIs including CI1 using an appropriate file system-level concurrency control mechanism.

After a file system object such as F1 is created and its contents are stored at the devices of a particular storage device group, the IFSM may collect various statistics or metrics associated with the object over time in some embodiments. The collected data may include, for example, access metrics such as how often or how recently the object was read or written, as well as other metadata such as the size of the object, the number of distinct users that accessed the object, the rate at which the object grew or shrank, and so on. Based at least in part on one or more such metrics, the IFSM may initiate a transfer of at least a portion of the object from its initial storage device group to a different storage device group at some point. The transfer may be initiated, for example, to reduce the cost to a client of storing the object, since different storage device groups may offer different billing rates and different pricing policies. The transfer may also be triggered in some cases by an expectation that the object is not as likely to be re-accessed or re-written soon if it has not been accessed for some period of time, for example. The transfer may be performed without receiving an explicit request from a client—that is, a client may not be aware that the IFSM is transferring contents of some files from one storage device to another—while maintaining an unchanged view or presentation of the file system contents to the client. For example, if the client lists the contents of F1's directory before or after the transfer using an "ls" or "dir" command, the same set of objects may be provided in the response in both the pre-transfer and post-transfer cases in at least some embodiments. Similar transparent transfers of a given file system object such as F1 may be initiated between several different storage groups over time. For example, if F1 is initially stored in storage device group SDG1, it may be moved to a different storage device group SDG2 after 7 days of low use or non-use, to a third storage device group SDG3 after a month of inactivity, and so on. To the client, meanwhile, through all these transitions, F1 may continue to remain just as accessible (using various file system commands or tools) as another file system object F2 which may have been used much more frequently and therefore have been retained at SDG1. In some embodiments, the IFSM may include or utilize a learning engine that analyzes collected metrics and/or other data or metadata associated with various file system objects using a variety of machine learning techniques and models. Output (e.g., model predictions regarding future access patterns) of the learning engine may be used at the IFSM to modify policies or decisions regarding when or where to transfer contents of various file system objects in such embodiments.

In at least some embodiments, if and when a file system object F1 which was initially stored at one storage device group SDG1 and then transferred to another storage device group SDG2 due to a low rate of accesses is eventually re-accessed, F1 may be transferred in the reverse direction, e.g., back to SDG1. As in the case of the transfer from SDG1 to SDG2, in some such embodiments, the reverse transfer may be initiated by the IFSM on the basis of newly-obtained access metrics and applicable transfer policies or rules, without any specific client request to perform the reverse transfer. The physical location at which the contents of F1 are stored when it is moved back to SDG1 may differ from its initial location in at least some implementations. In some embodiments, if the object has been transferred through a chain of storage device groups such as SDG1-SDG2-SDG3-SDG4, the reverse transfer may occur in a single step from SDG4 to the initial storage device group SDG1. In other embodiments, the reverse transfers may be performed one SDG at a time—e.g., the object may first be moved back from SDG4 to SDG3, and then, based on additional metrics collected while it is present at SDG3, the object may be moved back to SDG2, and so on. In various embodiments, object permissions (such as read/write/execute permissions associated with files or directories) and other file system metadata may be maintained and used in a consistent manner by the IFSM regardless of the transfer(s) of the physical contents of the objects. Thus, if one user U1 is granted only read permission on a file F1, while another user U2 is granted read, write and execute permissions on F1, those permissions would continue to apply regardless of which storage device group or groups are used for storing F1 contents at any given point of time.

In one embodiment, clients may indicate various aspects of transfer policies or rules that are to govern the objects of one or more file systems established on the clients' behalf. For example, a client may know that the objects of a given file system FS1 are going to be used for a particular application such as a social media application, a software development application, or a document management application, and may be able to predict the access patterns (e.g., temporal sequences of reads and writes) expected for the objects. In such a situation, a client of the intelligent file system framework may provide an indication of the expected access patterns and/or a corresponding set of rules for transferring the file system objects to the IFSM. Client-provided transfer policies may also indicate desired levels of data durability, availability and/or budget limits of the client in some embodiments. The IFSM may utilize the client-provided rules or polices to override conflicting rules that may have otherwise been used by default in such embodiments.

A number of different approaches may be taken in different embodiments with respect to deleting the contents of a file system object F1 from the source storage device group SDG1 when the object is transferred to a destination storage device group SDG2. In some embodiments, depending for example of the relative amount of unused or free space available at the storage device of SDG1 where F1 was being stored, the IFSM may initially simply mark the contents of F1 as being eligible for eviction (e.g., in metadata being maintained at SDG1), without actually deleting or evicting the contents from SDG1. Later, if a new file system object F2 requires space at SDG1, and there is insufficient unused space to accommodate F2, F1 may be overwritten by F2 in one such embodiment. In the interim, while F1 contents remain in SDG1 in the eligible-for-eviction state even though F1 has been transferred to SDG2, if a request to access F1 is received, the response may be provided from SDG1 if, for example, it is quicker to do so than to provide the response from SDG2.

In addition to marking F1 contents as eligible for eviction in the source SDG, in at least some embodiments the IFSM may ensure that the client is no longer billed for the storage used for F1 within SDG1 after F1 has been made eligible for eviction. For example, a metadata entry representing a billing status or billing mode may be associated with various file system objects in one such embodiment. If the billing status for F1 is set to "ON" with respect to SDG1, the client on whose behalf F1 is created may be responsible for billing costs associated with the amount of space being used for F1 at SDG1. If the billing status is instead set to "OFF" with respect to SDG1, the client may not be billed for F1's residence in SDG1. If and when F1 is marked eligible for eviction within SDG1 after F1 is transferred to a different SDG, in at least one such embodiment F1's billing status with respect to SDG1 may be set to "OFF", so that the client does not have to pay for the space being used for F1 within SDG1. In some embodiments, the techniques described above with respect to marking file system objects as eligible for eviction and changing the billing status may not be employed.

Example System Environment

FIG. 1 illustrates an example system environment in which an intelligent file system which transparently and automatically transfers file object contents between different storage device groups may be implemented, according to at least some embodiments. As shown, system 100 includes a provider network 105 at which a plurality of network-accessible services are implemented. The services may include, for example, a virtual computing service (VCS) 107, a block storage service (BSS) 108, and an object storage service (OSS) 109. The VCS 107 may include a plurality of instance hosts (IH) 115, such as IH 115A and 115B, each of which may be used for one or more guest virtual machines or compute instances (CIs) 133 launched on behalf of various clients in a multi-tenant or single-tenant mode. Thus, CIs 133A and 133B may be launched on IH 115A, while IH 115B may be used for CIs 133K and 133L.

The instance hosts and network-accessible services of provider network 105 may collectively include a variety of groups of storage devices, which may differ from one another in various characteristics such as the programmatic interfaces supported, performance capabilities, availability levels, data durability levels, pricing/billing policies, physical/geographical locations, security characteristics, and so on. For example, some or all of the instance hosts 115 may be configured with local storage devices, such as local solid state drives (SSDs) 140A and 140B at IH 115A and 115B respectively and/or local rotating magnetic disk devices (MDDs) 142A and 142B at IH 115A and 115B respectively. The local MDDs may be considered one example of a storage device group 116A, while the local SDDs (which may differ at least in performance capabilities from the MDDs) may be considered a second SDG 116B. The block storage service 108 may comprise at least two SDGs 116C (comprising SSDs 144) and 116D (comprising MDDs 145) in the depicted embodiment. The OSS 109 may comprise at least three SDGs in the depicted embodiment: SDG 116E comprising SSDs 144, SDG 116F comprising MDDs 145, and SDG 116G comprising delayed-access devices 146 such as disk-based or tape-based devices with longer average response times for I/O operations than the MDDs of SDG 116F. Delayed-access devices 146 may be used, for example, at least in part as archival storage for objects that are not expected to be accessed frequently relative to the objects stored at the other SDGs. In addition to the SDGs available within the provider network 105, in at least some embodiments the CIs 133 may also be able to access data stored at the storage devices 149 of third-party storage services 188 outside the provider network. External storage devices may be organized in one or more additional storage device groups such as 116H, with different interfaces, performance, availability, durability, pricing, and other characteristics relative to the SDGs within the provider network (or relative to other third-party SDGs). Thus, a wide variety of storage devices and locations may be accessible from compute instances 133 in the depicted embodiment, collectively offering a far wider range of storage-related capabilities and features than may be available on the instance hosts of the compute instances.

An intelligent file system manager (IFSM) 150 may be implemented at the provider network 105, enabling easy-to-use file systems to be set up on behalf of various clients, such that individual objects of the file systems may be transparently moved between SDGs in accordance with various optimization criteria without requiring explicit instructions or guidance from the clients as to when or where a given object should be moved. The IFSM may comprise various administrative or control-plane components of the intelligent file system framework implemented at provider network 105 in the depicted embodiment. It is noted that although the IFSM 150 is shown as a single entity in FIG. 1, components of the IFSM may be distributed among various entities of the provider network 105 in various embodiments, including the instance hosts, resources of the storage services and/or other devices. In some embodiments, several different accessibility modes may be supported for intelligent file systems, including a private mode in which the contents of a file system are to be available only to a single compute instance, and one or more shared modes in which file system contents may be shared among multiple CIs 133. The accessibility mode for a given file system may be specified by a client (e.g., an external client program 160 or a client running at a CI 133) via programmatic interactions 170 or 172 with the IFSM 150 in various embodiments, e.g., as a parameter included in a request to create the file system. If a client does not indicate the accessibility mode when requesting the establishment of a file system, in some embodiments the IFSM may select a default accessibility mode for the file system.

Depending on various factors, including for example the accessibility mode, the IFSM may choose one or more storage devices of one or more SDGs as the initial location at which contents of the files and/or other objects of a given file system are to be stored in the depicted embodiment. For example, for a private mode file system to be accessed from CI 133A, file contents may initially be stored at an SDD of instance host 115A. The IFSM 150 may collect (e.g., using a fleet of collector agents distributed among the instance hosts and the various services of provider network 105) various measurements regarding the use of various file system objects. Based on an analysis of the usage metrics and/or on various file system object transfer policies 151, the IFSM may automatically transfer portions or all of the contents of various objects between SDGs—e.g., a file F1 that was initially stored at an SSD 140A of IH 115A may be transferred to an MDD 145 of BSS 108, and from the MDD of BSS 108 it may eventually be transferred to an MDD 147 of OSS 109. A learning engine 152 of the IFSM may analyze file system metrics collected over time using various machine learning techniques (including, for example, supervised learning approaches such as linear regression and/or unsupervised learning approaches such as clustering). Output from the learning engine 152 may be used to modify one or more policies 151, or to select the particular policy or policies to be used for initial placement and/or transfer decisions for a given file system objects. In some implementations, one or more file system objects may even be transferred at least temporarily to external storage services such as storage service 188. In some embodiments, the IFSM may store at least a subset of file system metadata (e.g., permissions, inodes, block maps or similar structures) within a repository that is distinct from the storage devices used for the data contents of the file system. In other embodiments, at least a subset of the metadata may also be transferred between SDGs.

These various transfers may be made without notifying the clients on whose behalf the file system objects were created in at least some embodiments, and without changing the view of the file system contents that is provided to the clients. For example, if files F1 and F2 were created within a directory D1, regardless of which particular SDG file F1 or F2 happen to be located in at any given time, both files may still be included in a directory listing of D1 just as they would have been listed if they had remained in their original SDGs. In at least some embodiments, a file may initially be stored at an SDG which supports relatively quick response times, e.g., under the assumption that files are typically accessed most frequently shortly after they are created; later, if the file is not accessed very frequently, it may be moved to a cheaper SDG with longer access times. If, after a file has been moved to a slower or more distant (e.g., in terms of the access latency) SDG, the file is accessed again, it may be moved back to an SDG that supports fast accesses, again without notifying or informing the client regarding the transfer. If the file then remains un-accessed for some time period, or meets the transfer criteria being used by the IFSM, it may be moved again to a slower/cheaper SDG. Thus, over time, the contents of a given file system may be dispersed across various SDGs in accordance with the IFSM's optimization strategies (e.g., strategies intended to minimize the costs to the file system clients and the provider network, while providing acceptable levels of performance). In this way, the benefits of the wide variety of storage-related features available in cloud environments may be made available to file system clients while maintaining compatibility with traditional file system interfaces, thereby requiring little or no additional client effort relative to the amount of client effort required to use more restricted file systems.

Private Accessibility Mode

Figure 2:
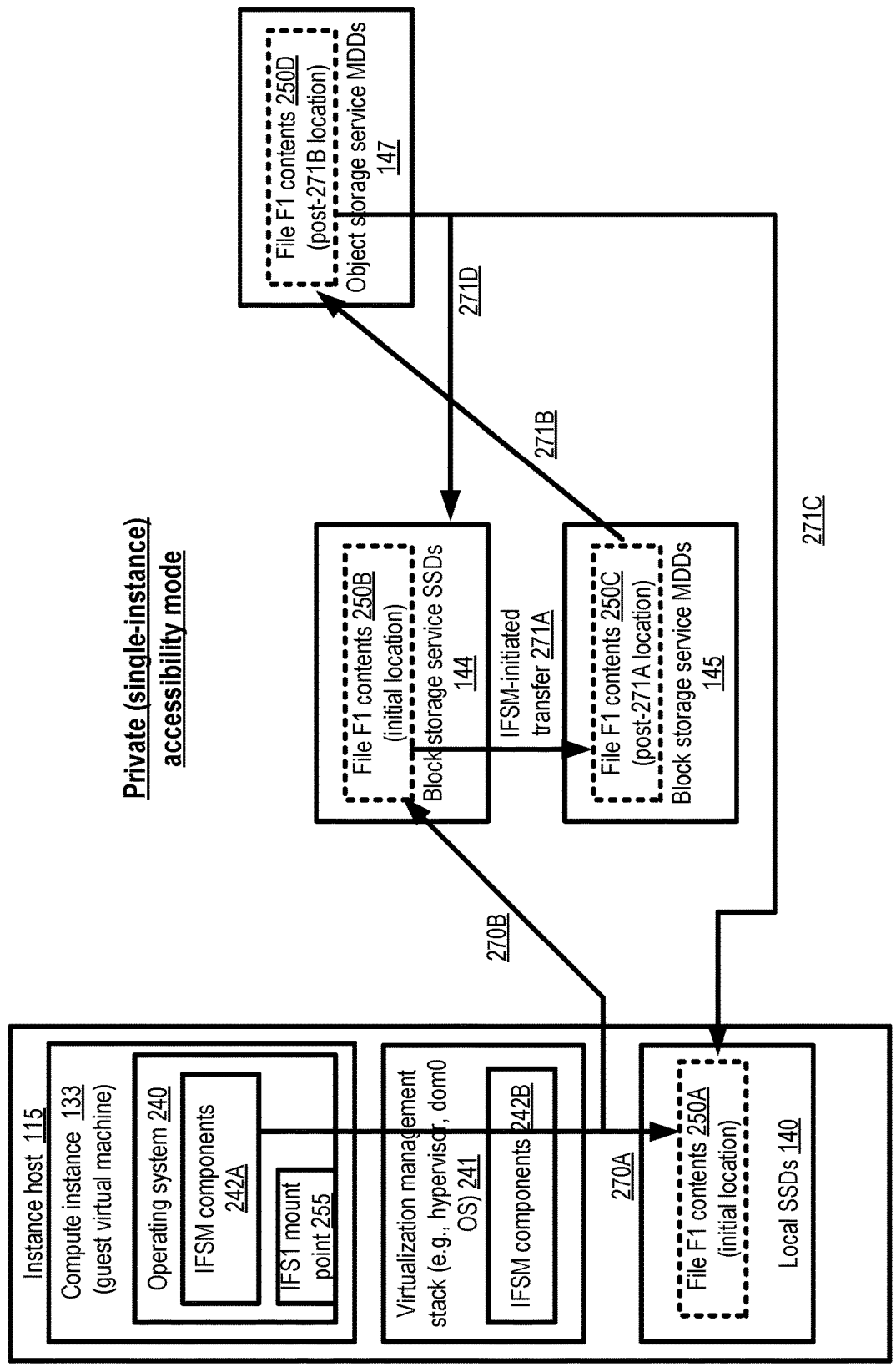
FIG. 2 illustrates an example of an intelligent file system configured in a private accessibility mode in which contents of file system objects are accessible from a single compute instance, according to at least some embodiments.

FIG. 2 illustrates an example of an intelligent file system configured in a private accessibility mode in which contents of file system objects are accessible from a single compute instance, according to at least some embodiments. As shown, compute instance 133 is implemented as a guest virtual machine at an instance host 115, and access to the contents of an intelligent file system is to be supported only for applications (or other software components) running at the compute instance 133. The IH 115 incorporates a virtualization management software stack 241, which may for example include a hypervisor and/or an administrative instance of an operating system running in a privileged domain (sometimes referred to as domain zero or dom0). In general, the virtualization management software stack may act as an intermediary between the compute instance 133 and hardware devices that are to be accessed from the compute instance—e.g., when a network packet is to be transmitted from instance 133 to some destination outside IH 115, the packet may be intercepted and/or encapsulated at a virtualization management component before it is passed to a network interface card which is to place the packet on a physical network link towards its destination. Similarly, the virtualization management software stack may act as an intermediary between the instance 133 and local storage devices such as SSDs 140 in the depicted embodiment.

The operating system 240 that is used for the compute instance 133 may include one or more components of an IFSM 242 (as well as components of other file system types that may be supported for the compute instances, such as various traditional Linux-based file systems or traditional Windows-based file systems). In at least some embodiments, the virtualization management software stack 241 may also include IFSM components 242B. A mount point 255 (e.g., a directory within the compute instances root directory) may be established to attach the private mode intelligent file system IFS1 in the depicted embodiment. Since a private-mode intelligent file system is created for use from instance 133, the IFSM components resident at the IH 115 may select a local storage device of the IH such as an SSD 140 as the initial location for contents 250A of a file F1, as indicated by arrow 270A. In addition, in order to provide a level of fault tolerance which enables F1 to survive a crash of the CI 133 or IH 115, contents 250B of the file F1 may also be replicated to a block storage service SSD 144 in the depicted embodiment. Thus, in some embodiments, contents of a file may initially be replicated at two (or more) SDGs. In various embodiments, at least by default, the client may not be made aware that F1 is being replicated, and may not be informed regarding the particular type(s) of storage devices being used; instead, the client may simply be informed that a file F1 has been created as requested in the intelligent file system. In some implementations, one or more programmatic interfaces may be implemented to enable advanced users to determine the type(s) of storage devices being used for their file system objects.

After F1 has been created and its contents are stored at local SSDs 140 and BSS SSDs 144, the IFSM (e.g., one or more of the components 240 or 242, and/or other IFSM components outside IH 115) may gather usage metrics and other statistics regarding F1 in the depicted embodiment. The IFSM may determine, based at least in part on access metrics and at least in part on the transfer policies in effect for the file system, to initiate the transfer 271A of F1 contents from their initial locations to magnetic disk drives (MDDs) 145 of the BSS. As a result, in some embodiments, F1 contents 250A and/or 250B may be deleted after they have been copied as F1 contents 250C at the MDDs. In other embodiments, F1 contents need not necessarily be deleted from their original locations for at least some period of time after a transfer, as described below in further detail. The IFSM may continue monitoring the usage of F1, and, based on the transfer criteria being used for the file system, may eventually decide to transfer F1 contents from BSS MDDs 145 to OSS MDDs 147 in the depicted embodiment, as indicated by transfer 271B. If, after F1 has been transferred to the OSS MDDs, F1 is accessed by a client, the contents of F1 may be transferred back to local SSDs 140 and/or BSS SSDs 144 in the depicted embodiment, as indicated by the arrows labeled 271C and 271D. It is noted that in other implementations of private accessibility mode, the initial locations for F1 and the manner or sequence of the transfers of the F1 contents may differ: for example, in one implementation, local MDDs rather than SSDs may be used as the initial locations of at least some types of file system objects.

Figure 4:
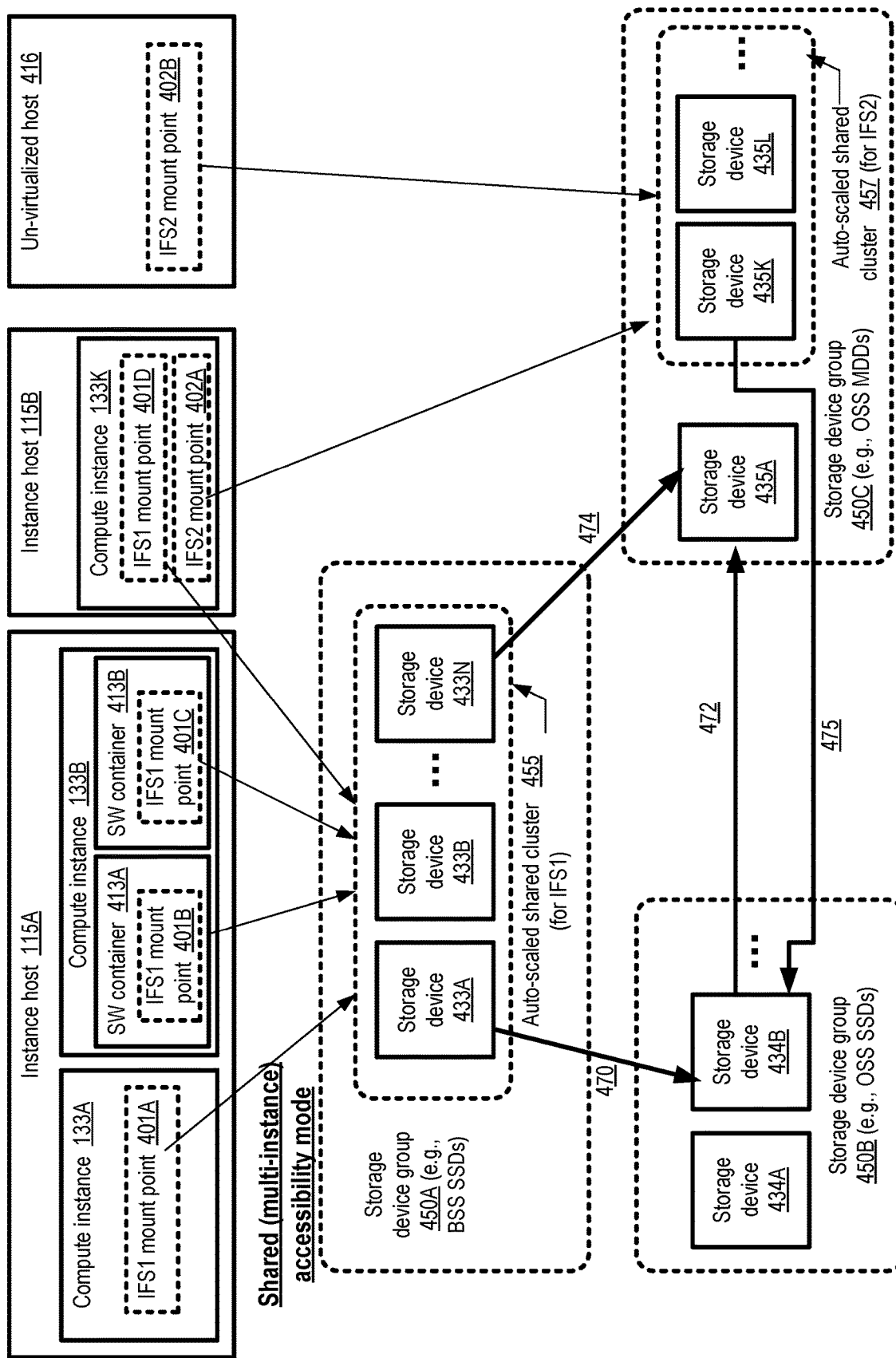
FIG. 4 illustrates an example of an intelligent file system configured in a shared accessibility mode in which contents of file system objects are accessible from a plurality of compute instances, according to at least some embodiments.

In some embodiments in which a given intelligent file system is to be accessed from a single host (e.g., either an instance host or an un-virtualized host), multiple software containers may be set up within a virtualized or un-virtualized operating system of the host, and respective mount points may be set up for the file system within each container. An example of container-based access to intelligent file systems is shown in FIG. 4 and described below in further detail.

Client Views of File System Objects

Figure 3A:
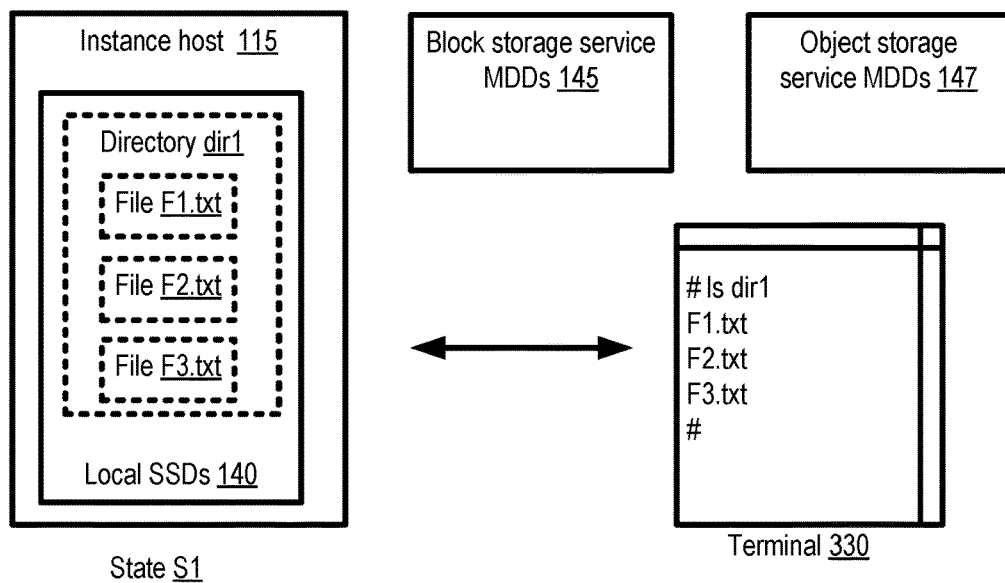
FIG. 3a and FIG. 3b collectively illustrate the manner in which the view of a file system that is provided to file system users may remain unaffected despite transfers of file system objects between storage device groups, according to at least some embodiments.
Figure 3B:
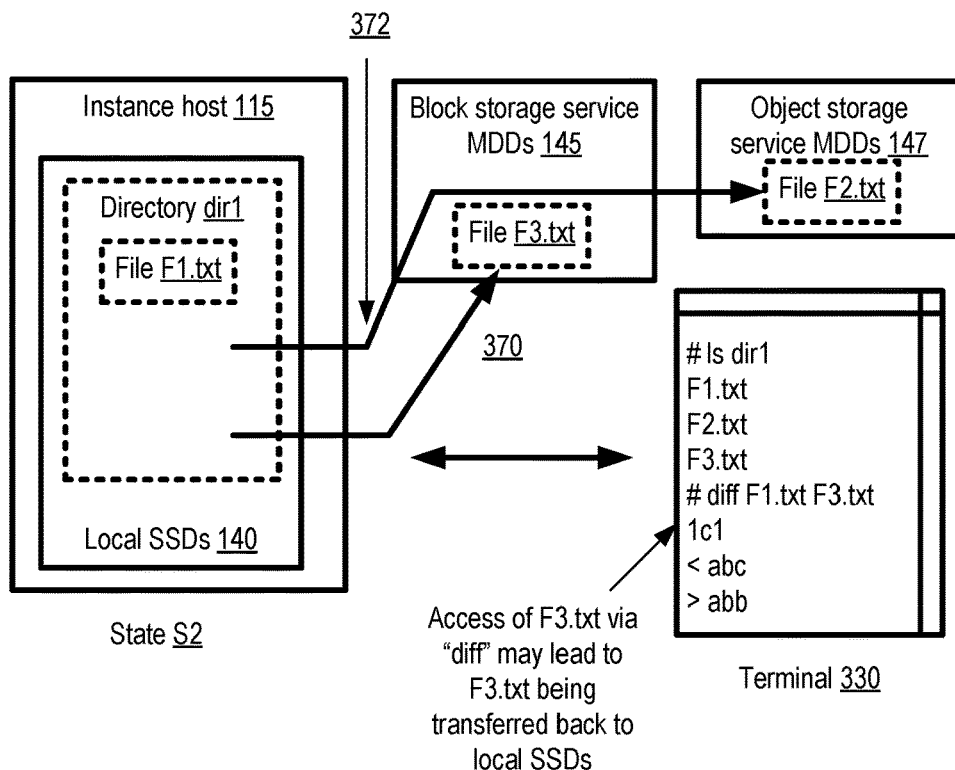

FIG. 3a and FIG. 3b collectively illustrate the manner in which the view of a file system that is provided to file system users may remain unaffected despite transfers of file system objects between storage device groups, according to at least some embodiments. FIG. 3a illustrates a state S1 of three files F1.txt, F2.txt and F3.txt of a directory dir1 of an intelligent file system to be accessed from a compute instance at instance host 115, while FIG. 3b illustrates a later state S2. For each of the states S1 and S2, the response that may be provided to a client to an "ls" or "list directory contents" command for dir1 are shown in a terminal window 330.

In state S1, contents of the three files are stored at local SSDs 140 of the instance host 115. Two other storage device groups are shown: the MDDs 145 of a block storage service, and the MDDs 147 of an object storage service. In state S1, none of the contents of F1.txt, F2.txt or F3.txt have been transferred to either of the other two storage device groups. When a client issues the command "ls dir1" in terminal 330 (e.g., from a compute instance running on host 115), all three files are shown in the dir1 listing without any indication of the storage device group being used.

At some point after the state S1 illustrated in FIG. 3a, file F3.txt is transferred by an IFSM to an MDD 145 of the block storage service, as indicated by arrow 370 of FIG. 3b. In addition, by the time the illustrated state S2 is reached, file F2.txt has been transferred (via an MDD 145) to an MDD 147 of the object storage service, as indicated by arrow 372. When the client again issues an "ls" command, as indicated in terminal 330 of FIG. 3b, the result is the same as it was in state S1: namely, the three files are listed as members of directory dir1, without any indication of the fact that three different types of storage devices with different characteristics are being used for the three files. If the client then issues a command that results in an access of one of the files that is no longer in a local SSD, that file may be moved back to a local SSD in the depicted embodiment. Thus, for example, the issuance of the "diff F1.txt F3.txt" command in terminal 330 to indicate the differences between F1.txt and F3.txt results in a read directed to F3.txt (as well as F1.txt). Depending on the transfer policies being used by the IFSM, such a read may trigger the transfer of contents of F3.txt back to a local SSD 140. It is noted that the specific SSD used after F3.txt is moved to local SSD storage, or the specific location used within an SSD, may at least in some cases differ from the SSD or location that was used when F3.txt was originally stored locally at host 115. In the depicted embodiment, explicit client requests may not be required to implement any of the transfers from any of the storage device groups to any of the other storage device groups; instead, the intelligent file system manager may implement the transitions based on access metrics and applicable transfer policies.

Shared Accessibility Mode

FIG. 4 illustrates an example of an intelligent file system configured in a shared accessibility mode in which contents of file system objects are accessible from a plurality of compute instances, according to at least some embodiments. Two intelligent file systems IFS1 and IFS2 are created in the depicted embodiment. IFS1 is to be accessed from at least three compute instances 133A, 133B and 133K, while IFS2 is to be accessed from at least two compute instances 133K and 133L. Compute instances 133A and 133B run at instance host 115A, while compute instances 133K and 133L run at a different instance host 115B. As shown, some compute instances such as 133B may include one or more software containers, such as containers 413A and 413B, from which various file systems such as IFS1 may also be independently accessed. In addition to instance hosts 115 that are used for virtualization of computing resources, the provider network may also include various un-virtualized hosts such as host 416 in the depicted embodiment, and the intelligent file systems may also be accessed from such un-virtualized hosts. An un-virtualized host may also include a plurality of software containers in at least some embodiments. In the depicted embodiment a given intelligent file system instance may be configured to be accessed from multiple compute instances (and/or software containers 413) running at multiple instance hosts (as in the case of IFS1), or from some combination of compute instances and un-virtualized hosts (as in the case of IFS2). In some embodiments, each compute instance 133 or software container 413 may mount or logically attach a given file system such as IFS1 or IFS2 to a respective mount point (such as a directory established within the root file system of the instance), e.g., by issuing a mount command or its logical equivalent before reads and writes to the file system's objects can be issued. Thus, for IFS1, mount point 401A has been set up at instance 133A for IFS1, mount point 401B has been set up at container 413B of instance 133B, mount point 133 has been set up at container 413B of instance 133B, and mount point 401D has been set up at instance 133K. For IFS2, mount point 402A has been established at instance 133K, and mount point 402B has been set up at un-virtualized host 416. In general, any desired number of compute instances or containers distributed across one or more hosts may each set up any desired number of mount points to access respective intelligent file systems, in a manner similar to the way that conventional types of file systems may be mounted.

Different storage device groups may be selected as the initial locations for file system objects for IFS1 and IFS2 in the depicted embodiment. In some embodiments, the selection of the initial locations may be guided or directed by client request parameters—e.g., a client may either directly indicate the types of storage devices that are to be utilized as the initial locations for the files of a given intelligent file system, or the client's requirements regarding data durability, availability or performance may indirectly lead the IFSM to select a particular storage device group. For IFS1, an auto-scaled shared cluster 455 comprising a plurality of storage devices of SDG 450A have been selected as the initial location, while for IFS1, auto-scaled shared cluster 457 comprising a plurality of devices of storage device group 450C has been identified as the initial location. The nodes of a cluster (such as devices 433A-433N of cluster 455, or devices 435K and 435L of cluster 457) may collectively implement partitioning of large file system objects in some embodiments—e.g., a large file may be split into respective partitions that are placed on some subset or all of the nodes. In at least one embodiment, a replication or redundancy technique (e.g., full replication of file system objects, replication combined with partitioning in a manner conceptually similar to the techniques used in various types of RAID devices (redundant arrays of inexpensive disks), or schemes such as erasure coding) may be used across the nodes of a cluster to achieve the desired level of data durability for a given IFS. In some implementations different nodes of a given cluster may be located in different data centers or different availability containers of the provider network. An availability container may represent a group of physical resources (such as hosts, network equipment, or storage devices) and associated infrastructure components (e.g., power supplies, heating and cooling systems, and the like) that have been engineered in such a way that a failure within one availability container does not lead to cascading or correlated failures at other availability containers. Replication and/or partitioning techniques may be used for private-mode intelligent file systems as well in at least some embodiments. It is noted that shared accessibility mode may not always require a cluster of storage nodes to be used—e.g., a given shared file system may be set up at a single storage device and accessed from multiple compute instances in at least some embodiments.

In some embodiments, a concurrency control mechanism may be implemented at the file system level by an IFSM, so that for example file system object contents are maintained at a desired level of consistency despite the possibility of concurrent or near-simultaneous update requests from several different instances 133. In the depicted embodiment, the clusters 455 and 457 may be designated as being "auto-scaled" in that nodes may automatically be added to or removed from clusters 455 and 457 (e.g., by the IFSM) based on measured workloads or the aggregate sizes of the objects within a given file system. In some embodiments in which partitioning is used for large file system objects in combination with auto-scaling, at least some objects may be automatically and transparently (e.g., without specific repartitioning requests from clients) repartitioned by the IFSM when nodes are added or removed from the file system.

As in the case of intelligent file systems set up in the private accessibility mode, the contents of various file system objects of shared mode file systems such as IFS1 or IFS2 may be transferred transparently and without specific client-provided instruction among different storage device groups in the depicted embodiment. Thus, for example, contents of files stored at storage device 433A of SDG 450A may be moved to storage device 434B of SDG 450B (as indicated by arrow 470) based at least in part on access metrics collected by the IFSM for the files and/or on the specific transfer policies in use. From storage device 434B, contents of one or more of the files may be moved again, e.g., to storage device 435A of SDG 450C as indicated by arrow 472. Some file system objects may be moved directly from SDG 450A to 450C as indicated by arrow 474, e.g., instead of first being moved to SDG 450B and then later being moved to SDG 450C. Contents of IFS2 objects may be moved from their initial location in SDG 450C to new locations in SDG 450B in the depicted embodiment, as indicated by arrow 475. In some cases, the initial location selected for a file system object by the IFSM may not be able to provide the desired performance, and the object may therefore be moved to a different SDG that is capable of higher performance: thus, the initial location may not necessarily offer the best performance level among the set of SDGs through which a given file system object passes during its lifetime.

Factors Influencing Placement and Transitions of File System Objects

Figure 5:
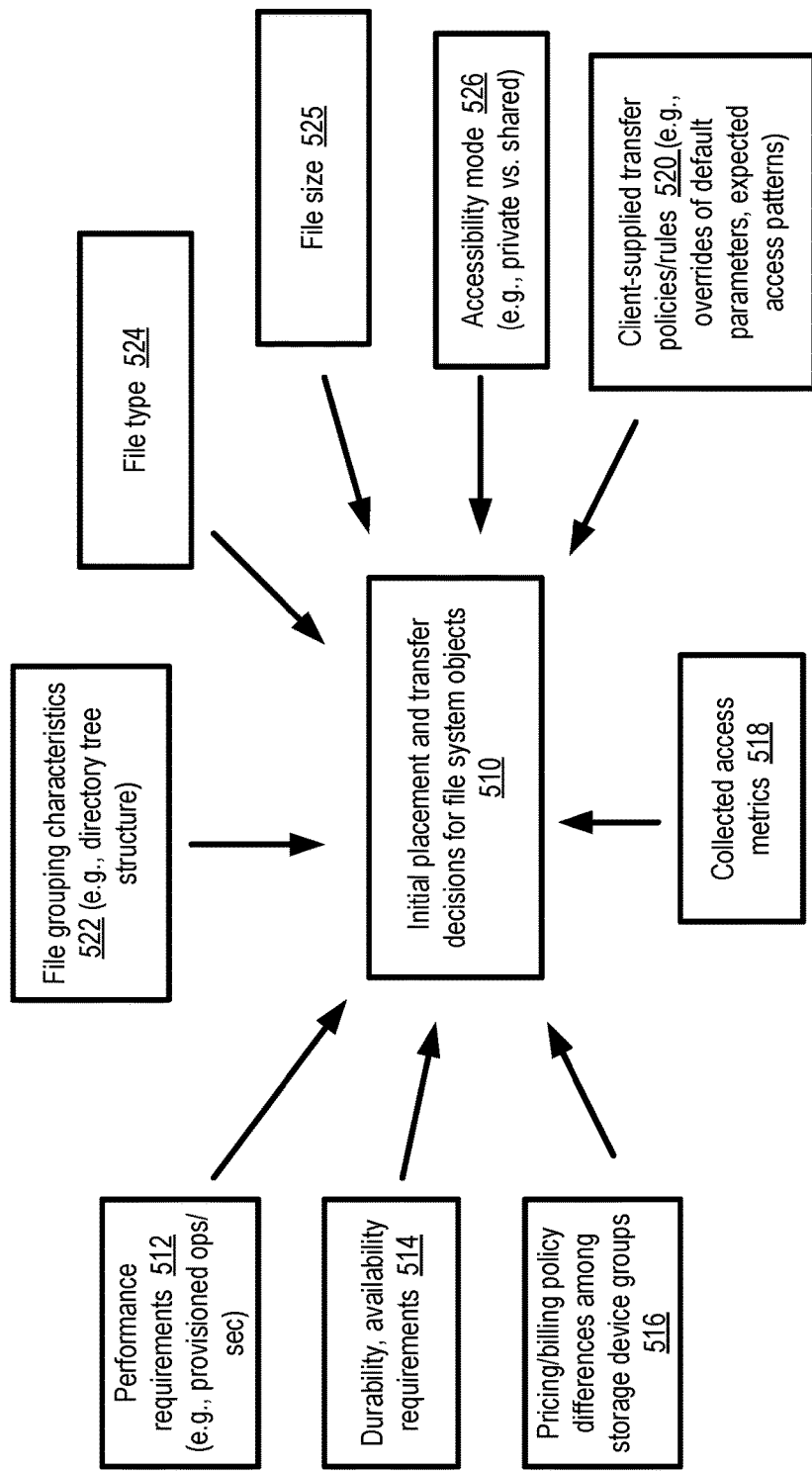
FIG. 5 illustrates examples of factors that may be used by a file system manager to determine the initial placement and subsequent transfers of file system objects, according to at least some embodiments.

FIG. 5 illustrates examples of factors that may be used to determine the initial placement and subsequent transfers of file system objects, according to at least some embodiments. In various embodiments, indications of some or all of the factors illustrated in FIG. 5 may be received programmatically by an intelligent file system manager (IFSM), e.g., as a result of invocations of a set of APIs by clients of the IFSM. Default settings for some or all factors may be used by the IFSM in scenarios in which clients do not indicate their specific preferences for the factors. Machine learning techniques which take some or all of the factors shown in FIG. 5 into consideration may be used to improve the placement and/or transfer decisions made over time in some embodiments.

Performance requirements 512, such as the desired throughput levels for reads and writes to a given file system instance or the desired latency for read and write operations may play a significant role in deciding at least the initial storage locations to be used for file system objects. In some embodiments, when requesting the establishment of an intelligent file system, a client may indicate a target rate of file system operations to be supported, which may be referred to as a "provisioned" operation rate, and the IFSM may select the storage devices to be used for the file system based on the target rate. In some implementations, the provisioned rate (or other performance requirements 512) may be expressed as a time-dependent function—e.g., a client may indicate that they would like the file system to support X reads or writes per second on objects that are less than a week old (i.e., objects whose creation time lies within the previous week), and Y reads or writes per second on objects that are older than a week. Data durability and availability requirements 514 may also influence the placement and/or transfer decisions 510 in various embodiments. For example, if a client requires very high levels of data durability for a set of files, the contents of the files may be replicated from the start at a cluster of storage devices which may be geographically distributed across multiple data centers or multiple availability containers. When making transfer decisions for such files, the IFSM may have to ensure that the targeted storage device group continues to provide at least the same level of data durability as the source storage device group. As with performance, data durability or availability goals may also be time-dependent in at least some embodiments. In at least some embodiments, performance, availability, durability or other requirements/preferences may be indicated at the file level or directory level, e.g., instead of or in addition to at the file system level.

In various embodiments, the minimization or reduction of the clients' billing costs associated with file system usage may be one of the primary optimization goals of the IFSM when it makes placement and/or transfer decisions. Accordingly, the billing and/or pricing policy differences 516 between the various available storage device groups may play a key role in the IFSM's decisions in such embodiments. As described earlier, the file system's accessibility mode 526 (e.g., private versus shared) may influence at least the initial locations of file system objects in some embodiments. Collected access metrics 518, such as the time that has elapsed since a particular file system object was written or read, or the rate at which read and write requests have been received over various time periods, repeatable patterns in which the reads or writes occur, and so on, may also impact the IFSM's decisions regarding transfers in various embodiments.

Clients may be permitted to override various aspects of the default transfer policies implemented by the IFSM in various embodiments. Some clients may programmatically provide their own transfer policies 520, for example, indicating the type of storage devices at which objects of a given file system are to be placed initially as well as the conditions that are to trigger transfers of the objects. Other clients may simply request a change to some of the default parameters being used by the IFSM, such as the threshold periods of inactivity that trigger various transfers. For example, while by default the IFSM may transfer unused files from local SSDs at an instance host to remote devices after one week of inactivity, a given client may wish to retain a particular directory's contents in local SSDs for two weeks of inactivity before transferring the directory contents elsewhere. In some embodiments, clients may be able to override the IFSM's transfer policies or rules at several different granularity levels—e.g., for all the file systems set up on behalf of a given client account, for a particular file system, for a particular directory, or for a particular file. In at least some embodiments, clients may provide a model or descriptor of expected access patterns for some or all objects of a file system to the IFSM. For example, some set of files may be used primarily for financial or accounting reasons, and may therefore be heavily accessed in the last two weeks of each financial quarter, and very lightly accessed at other times. If the client provides an indication of such an access pattern to the IFSM, the files may be transferred to fast (and potentially more expensive) storage devices just before the expected periods of heavy usage, and moved to less expensive storage devices for the expected periods of low traffic. In some embodiments, as described earlier, machine learning techniques may enable the IFSM to detect such usage patterns and modify transfer policies, regardless of whether the client indicates the patterns or not.

In some embodiments, various attributes of the file system objects may be used to determine transfers and/or initial placement. For example, for a given file, the file type 524 (which may be discerned from a file name or extension) and/or file size 525 may influence the IFSM's decisions in one embodiment. In some embodiments, file grouping characteristics, such as the co-location of various files within a given directory tree, may influence how the files are treated with respect to transfers. For example, in one embodiment, the IFSM may in general try to ensure that files that are present within a given directory are stored at the same storage device group, so as to avoid large differences in perceived performance for different files of the same directory. Factors other than those shown in FIG. 5 may be used by IFSMs to make file placement and transfer decisions in various embodiments, and some of the factors shown in FIG. 5 may not be used in some embodiments.

Optimizing Access Time to Previously-Transferred File System Objects

Figure 6:
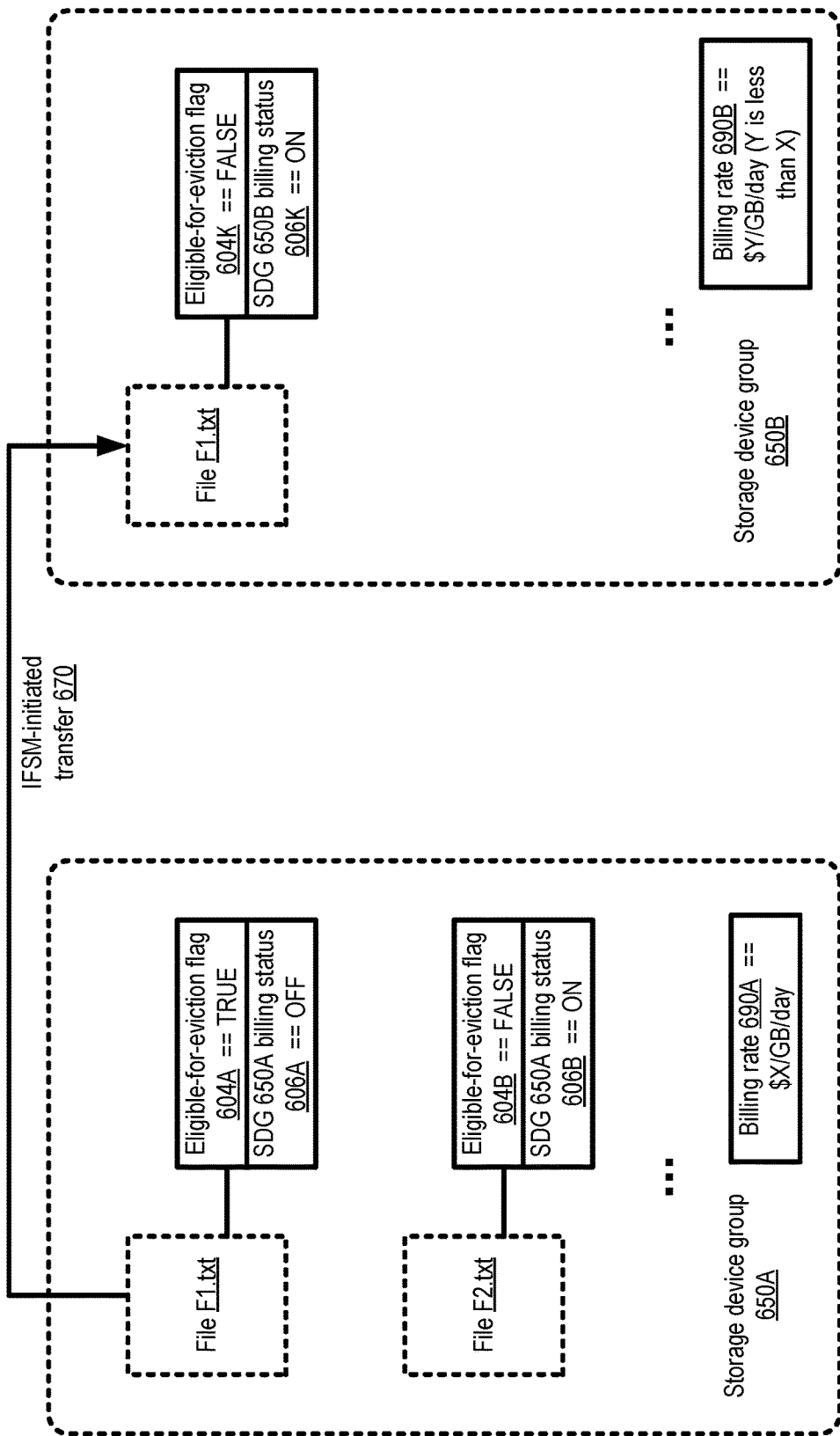
FIG. 6 illustrates examples of metadata entries that may be used to optimize access times to transferred file system objects while controlling corresponding billing costs for clients, according to at least some embodiments.

In many cases, file system object contents may be transferred from faster storage devices (e.g., local SSDs) to slower storage devices (e.g., BSS MDDs or OSS MDDs), e.g., in order to reduce costs. Depending on how much free storage space is available at a given storage device group, in some embodiments an IFSM may be able to provide faster access to an object than may be expected after such a transfer. FIG. 6 illustrates examples of metadata entries that may be used to optimize access times to transferred file system objects while controlling corresponding billing costs for clients, according to at least some embodiments.

In the embodiment illustrated in FIG. 6, storage device groups 650A and 650B differ in their pricing policies. According to billing rate 690A of SDG 650A, the cost (to a client) for storing a gigabyte of data for one day is $X. According to billing rate 690B of SDG 650B, the cost of storing a gigabyte of data for one day is $Y, where Y is smaller than X. In order to reduce clients' billing costs, the IFSM may therefore initiate a transfer 670 of contents of file F1.txt from SDG 650A to SDG 650B in the depicted embodiment. If the amount of free or unused space in SDG 650A is above a threshold, however, the IFSM may not necessarily delete the contents of F1.txt from SDG 650A in the depicted embodiment. Instead, the IFSM may change eligible-for-eviction flag 604A of file F1.txt to "TRUE", indicating that if and when additional storage space is needed at SDG 650A, the contents of file F1.txt may be evicted or overwritten. Another metadata entry associated with F1.txt. SDG 650A billing status 606A, may be set to "OFF" to indicate that since the contents of the file have been transferred to lower-cost SDG 650B, the client should no longer accrue billing costs for the space that is being used in SDG 650A for F1.txt. The corresponding metadata settings for the copy of F1.txt that has been copied to SDG 650B may differ in the depicted embodiment. The eligible-for-eviction flag 604K may be set to "FALSE", for example, indicating that F1.txt should not be overwritten within SDG 650B because space is reserved specifically for F1.txt in SDG 650B. The SDG 650B billing status 606K may be set to "ON", indicating that the client should be billed for the storage space used for F1.txt on the basis of SDG 650B's billing rate. For a different file F2.txt, whose contents are stored in SDG 650A and have not been transferred elsewhere by the IFSM, the eligible-for-eviction flag 604B may be set to "FALSE", and the SDG 650A billing status may be set to "ON" in the depicted embodiment.

If a request to access F1.txt is received after eligible-for-eviction flag 604A is set to true, in at least some embodiments the IFSM may provide the contents of F1.txt from the copy that remains in SDG 650A, which may result in a quicker response to the requester than if the copy from SDG 650B were used. In some embodiments, depending on the specific transfer policy in effect, such a read may result in a reversal of the metadata entries of F1.txt. For example, since F1.txt has been accessed recently, the copy in SDG 650A may become the primary or official copy from the perspective of the IFSM, the eligible-for-eviction flag 604A may be set to "FALSE", and the SDG 650A billing status 606A may be set to "ON". In addition, depending again on the specifics of the transfer policy, the copy of F1.txt in SDG 650B may be deleted or marked as eligible for eviction, and the client may no longer be billed for the copy that was earlier stored in SDG 650B.

Rapid Cloning of Intelligent File Systems

Figure 7:
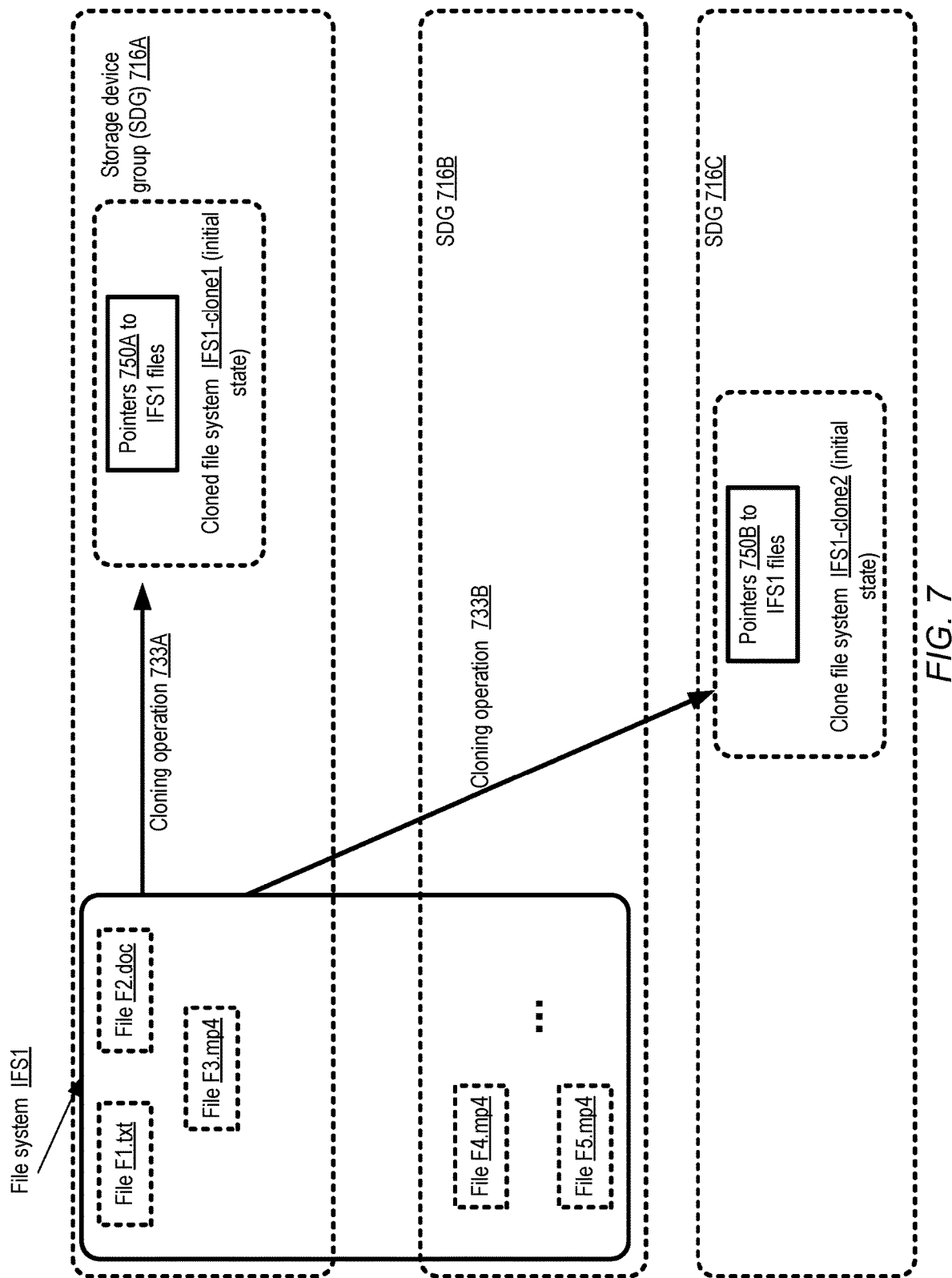
FIG. 7 illustrates examples of rapid cloning of intelligent file systems, according to at least some embodiments.

In some embodiments, the programmatic interfaces supported by an IFSM may include interfaces for cloning operations at various levels of the file system namespace, and the IFSM may be able to provide near-instantaneous responses to cloning requests at the file system level. FIG. 7 illustrates examples of rapid cloning of intelligent file systems, according to at least some embodiments. In the depicted embodiment, objects of an intelligent file system IFS1 are shown distributed between two storage device groups 716A and 716B. For example, files F1.txt. F2.doc, and F3.mp4 are stored in SDG 716A, while files F4.mp4 and F5.mp4 are stored in SDG 716B.

The client on whose behalf the source file system IFS1 was established may determine that one or more clones of IFS1 are to be created. Using the programmatic interfaces of the IFSM, in the depicted embodiment the client may issue a cloning request indicating the destination SDG within which the clone of IFS1 is to be stored. If the clone is to be created in SDG 716A, the IFSM may implement cloning operation 733A. Cloning operation 733A may include the storing by the IFSM of metadata indicating that file system IFS1-clone1 has been created, and the storing of pointers 750A to the IFS1 files in the depicted embodiment, without actually copying contents of the files to any different storage locations than were already being used. Thus, it may be possible for the IFSM to respond very rapidly to the client, indicating that the cloned file system IFS1-clone has been created. If and when the client subsequently submits a read or write request directed to the cloned version of a file such as F1.txt within IFS1-clone1, the contents of F1.txt may be copied to new storage locations within SDG 716A in the depicted embodiment. In some embodiments, the IFSM may apply transfer policies to the file system objects of cloned file systems in a manner similar to that in which transfer policies were applied to the source IFS. For example, if the cloned copy of F1.txt within IFS1-clone1 is not used for some period of time, the cloned copy may be moved to SDG 716B or a different SDG. In at least one embodiment, different transfer policies may be used by default for a cloned file system than are used for the source file system from which the clone was created. For example, in one embodiment, by default the IFSM may not transfer any file system object contents from the initial SDG selected for a cloned file system; instead, the IFSM may assume that if the client wants automated transfers to be implemented at the cloned file system, the client would inform the IFSM programmatically.

A client may request that a clone of IFS1 be created within a different SDG than is currently being used for IFS1 in the depicted embodiment. For example, the client may request that IFS1 be cloned to SDG 716C in the depicted example scenario. In response to such a request, metadata indicating that IFS-clone2 has been set up as part of cloning operation 733B, and a set of pointers 750B to the IFS files may be stored by the IFSM. In some embodiments, a client need not necessarily indicate a target SDG for a cloning operation, and the IFSM may choose an SDG for the clone. A variety of policies may be used for selecting the target SDG in such a scenario: for example, in one implementation the IFSM may decide that the clone should be created within the fastest SDG at which objects of the source file system are being stored at the time that the cloning request is generated.

Methods for Implementing Intelligent File Systems

Figure 8:
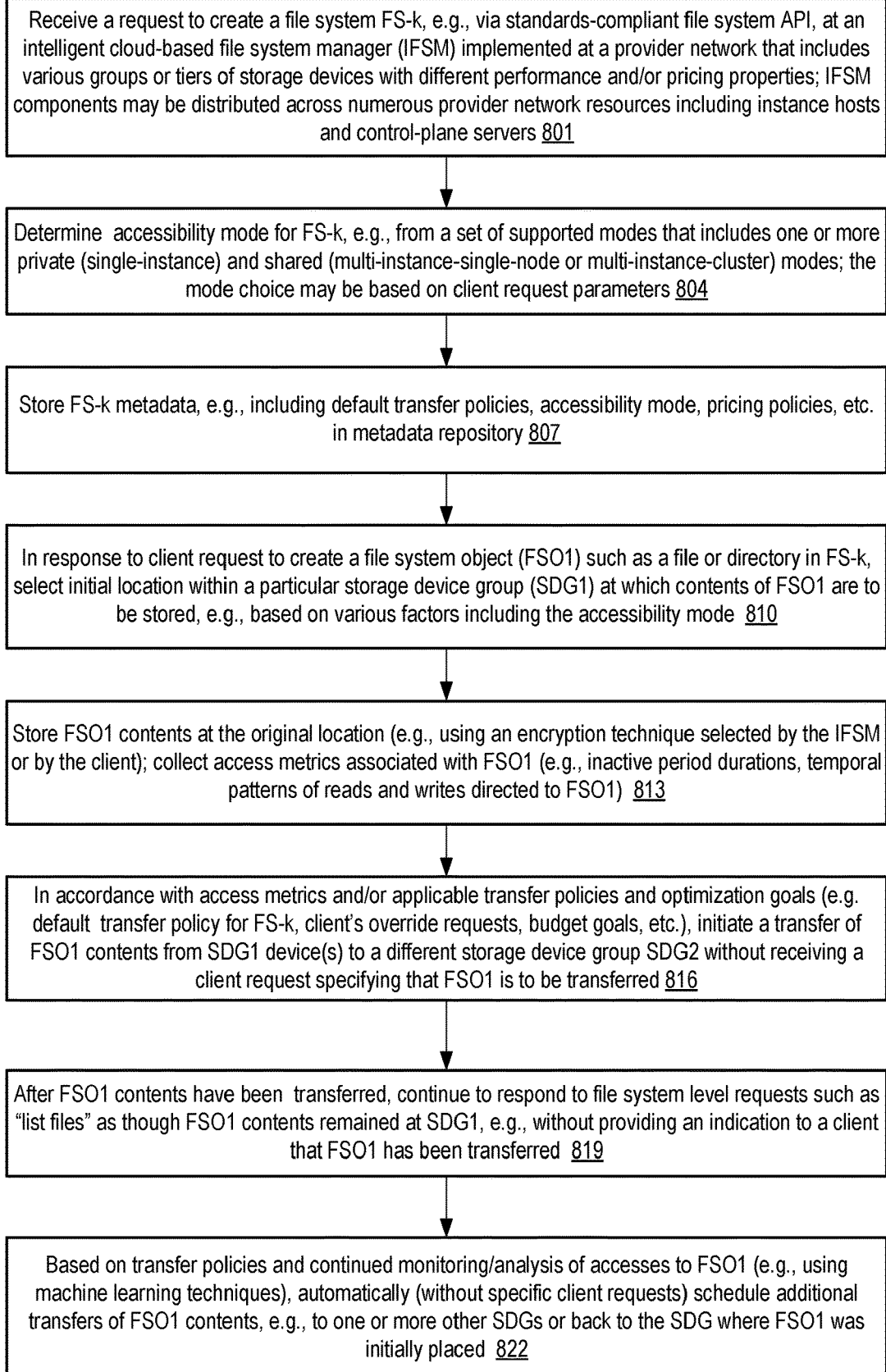
FIG. 8 is a flow diagram illustrating aspects of operations that may be performed to implement intelligent file systems with automated transfers of file system objects across storage device groups, according to at least some embodiments.

FIG. 8 is a flow diagram illustrating aspects of operations that may be performed to implement intelligent file systems with automated transfers of file system objects across storage device groups, according to at least some embodiments. As shown in element 801, a request to create a file system FS-k may be received at an intelligent file system manager (IFSM) of a provider network that includes several different groups or tiers of storage devices with different performance and/or pricing properties. The IFSM may itself be implemented in a distributed fashion in at least some embodiments, with some components incorporated within instance hosts of a virtual computing service of the provider network, other components located at administrative servers of various storage-related services implemented at the provider network, and still others instantiated at servers or hosts dedicated exclusively for file system management. In at least some embodiments the IFSM may support one or more sets of programmatic interfaces (such as APIs, command line tools, graphical user interfaces, web-based consoles and the like), and the command to create the file system may be received via such an interface. At least some of the programmatic interfaces implemented for the intelligent file system may be compliant with or compatible with existing file systems standards in the depicted embodiment, so that users of the intelligent file system need not have to familiarize themselves with new interfaces. In one embodiment in which programmatic interfaces that are compatible with existing standards may be supported, optional additional parameters that can be used by advanced users to specify details such as initial SDG locations for various file system objects may be supported for at least some of the interfaces.

The IFSM may determine, e.g., either based on client-specified parameters or using default settings, an accessibility mode for the file system to be established (element 804). The accessibility mode may be selected from a set of supported modes which includes at least one private or instance-specific mode and at least one shared mode in which the file system contents are to be made accessible to a plurality of compute instances. Several different shared modes may be supported in some embodiments, such as a multi-instance-single-node mode in which the contents of the file system are stored at a single storage server or device and are accessed from multiple instances, or a multi-instance-shared-cluster mode in which the contents of the file system may be partitioned and/or replicated among various nodes of a cluster of storage devices or storage servers. The IFSM may store metadata associated with FS-k in a metadata repository (element 807), including for example the accessibility mode, pricing and billing policies, and at least one transfer policy indicating the rules to be used to decide when and where to transfer the contents of various file system objects such as files and directories of FS-k. It is noted that at least in one embodiment, a particular transfer policy selected for a given file system may prohibit the transfer of at least some file system objects to any other SDGs than the initial SDG used for the objects—that is, some transfer policies may disallow certain types of transfers. After the metadata has been stored, the client may be informed that the requested file system is ready for use. In some embodiments the client may then mount or attach the file system to one or mount points (e.g., directories created within the respective root file systems of one or more compute instances).

A client may issue a request to create a file system object FSO1 such as a file or directory within FS-k. In response, as indicated in element 810, the IFSM may determine an initial storage device group SDG1, and a specific storage device or devices within SDG1, at which contents of FSO1 are to be stored. The initial location may be selected based on a variety of factors in different embodiments, such as those illustrated in FIG. 5, including the accessibility mode of the FS-k, the performance requirements associated with the object or with FS-k as a whole, data durability requirements and the like.

The contents of FSO1 may then be stored at the selected initial location(s) (element 813). In at least some embodiments, the IFSM may encrypt the contents of FSO1 before storing them at any SDG, e.g., using an encryption algorithm that is either selected by the IFSM or indicated by the client. Thus, in such embodiments, the security of the file contents may be managed at the file system level, instead of or in addition to using the security mechanisms that may exist at the various storage services whose SDGs are used for FS-k. Any of a variety of encryption techniques may be used in various embodiments, including for example asymmetric encryption using a public-private key pair designated for the client, for all the objects within FS-k, or designated specifically for FSO1. After the contents of FSO1 have been stored at SDG1, the IFSM may commence collecting various types of metrics associated with FSO1, including access-related metrics such as the time that has elapsed since FSO1 was last accessed, the patterns and timings of reads and writes, and so on. In some embodiments the IFSM may be able to use pre-existing metric collectors (e.g., monitoring agents that may already be implemented at the different storage services for billing-related monitoring or for performance monitoring); in other embodiments, dedicated metrics collectors may be set up for the intelligent file systems.

Based at least in part on the access metrics, the applicable transfer policies goals (e.g. a default transfer policy for FS-k, a client-specified transfer policy, or a combination of the client's override requests and the default policy) and/or the IFSM's optimization goals (which may include an overall goal to reduce or minimize billing costs for the client), the IFSM may initiate a transfer of FSO1 contents from SDG1 device(s) to a different storage device group SDG2 in the depicted embodiment (element 816). Such a transfer may be performed without receiving a client request specifying that FSO1 is to be transferred in at least some embodiments, and/or without informing the client that the transfer is going to be implemented (or has been implemented). Any of several different types of transfers may be implemented in different embodiments: for example, in one type of transfer, the contents of FSO1 may be deleted from SDG1 as soon as they are copied to SDG2, while in another type of transfer as illustrated in FIG. 6, the source version of FSO1 at SDG1 may be retained at least temporarily as long as there is sufficient space available to do so.

After the transfer, the IFSM may continue to respond to various file system requests, such as "ls" or similar listing commands, in the same manner as before the transfer—that is, to a client, no indication may be provided that contents of FSO1 have been transferred (element 819). The IFSM may continue monitoring FSO1 usage after the transfer. If the transfer policy in effect requires that FSO1 be moved back to SDG1 if it is accessed within a certain time period, for example, FSO1 may be transferred back in the event such an access occurs. Alternatively, FSO1 may be moved to one or more different SDGs over time, depending on the access metrics collected (element 822). Such transfers of FSO1 contents may be performed without informing the client in at least some embodiments. In at least one embodiment, one or more of the SDGs used for a given file system object may be owned or managed by an entity other than the provider network operator—e.g., an external or third-party storage service may be used, or a storage device group set up by the client at client-owned premises may be used. Machine learning techniques may be applied to help improve the placement and transfer decisions and policies implemented by the IFSM in some embodiments.

It is noted that in various embodiments, operations other than those illustrated in the flow diagram of FIG. 8 may be used to implement at least some of the techniques for supporting intelligent file systems at which automated transfers of file system contents are supported. Some of the operations shown may not be implemented in some embodiments, may be implemented in a different order than illustrated in FIG. 8, or in parallel rather than sequentially.

Use Cases

The techniques described above, of implementing an intelligent file system framework that optimizes the placement of file system objects using the variety of storage-related capabilities and storage device types that may be available in cloud computing environments, may be useful in a variety of scenarios. As more and more storage related services and features become available at provider networks, it may become harder for customers of the provider network to make optimal decisions about exactly where their files should be stored. At least some customers may prefer to rely on the provider network operators to make the right choices about file locations, either using default transfer policies or using policies comprising rules or preferences indicated by the customers. As long as specified constraints regarding performance, durability, availability and pricing are met, the customer may let the file system management infrastructure implemented at the provider network make low-level decisions regarding file placements and transfers. Such an approach may help reduce overall costs for the clients, and may also enable the provider network to better utilize the mix of storage devices that are available.

Illustrative Computer System

Figure 9:
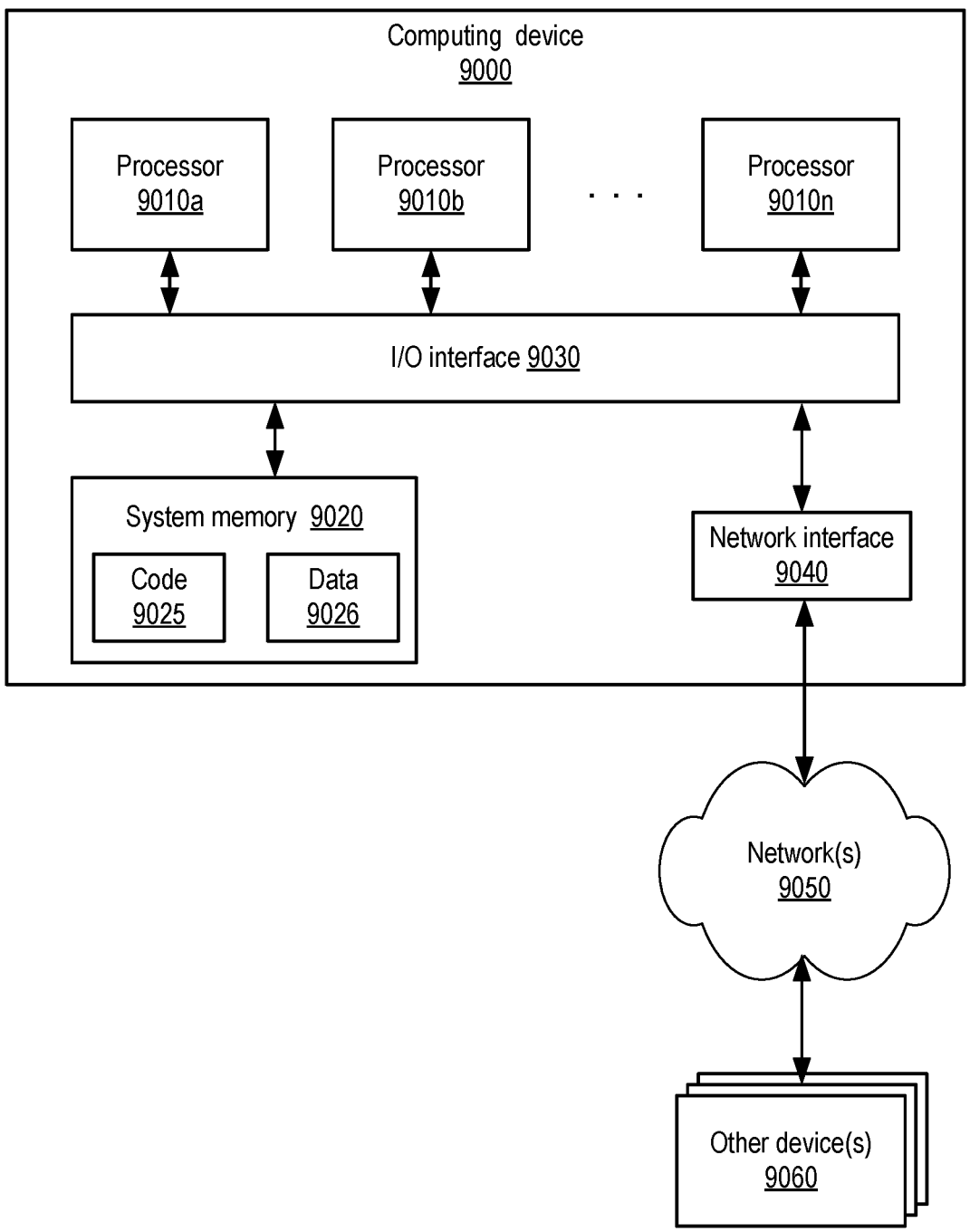
FIG. 9 is a block diagram illustrating an example computing device that may be used in at least some embodiments.

In at least some embodiments, a server that implements one or more of the techniques described above for supporting intelligent file systems that support automated transfers of objects between storage device groups may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method, comprising:
   initiating, based at least in part on detecting that a metric-based condition has been met, a transfer of at least a portion of contents of a first object from a first storage device of a cloud computing environment to a second storage device, independent of a client-initiated transfer request specific to the first object from a client of the cloud computing environment to which the first object belongs, wherein a difference in one or more properties between the first storage device and the second storage device provides a benefit of transferring the at least a portion of contents of the first object from the first storage device to the second storage device;

determining, based at least in part on a particular property of the first storage device, that storage space which was being used for the portion of contents at the first storage device prior to the transfer should be used to store a second object; and storing the second object in the storage space.

2. The computer-implemented method as recited in claim 1, wherein the first object comprises a file system object.

3. The computer-implemented method as recited in claim 1, wherein an object stored at the first storage device can be accessed at a first speed, wherein an object stored at the second storage device can be accessed at a second speed, and wherein the first speed differs from the second speed.

4. The computer-implemented method as recited in claim 1, wherein the benefit is that a cost of storing the first object on the second storage device is less that a cost of storing the first object on the first storage device.

5. The computer-implemented method as recited in claim 1, further comprising:
    collecting one or more metrics associated with the first object, wherein said detecting that the metric-based condition has been met is based at least in part on analysis of the one or more metrics, and wherein the one or more metrics include one or more of: (a) a frequency with which the first object is read or (b) a frequency with which the first object is written.

6. The computer-implemented method as recited in claim 1, wherein the particular property comprises a speed with which objects can be accessed from the first storage device.

7. The computer-implemented method as recited in claim 1, further comprising:
    transferring the portion of contents of the first object back to the first storage device from the second storage device, independent of a client-initiated transfer request specific to the first object from the client.

8. A system, comprising:
    one or more computing devices;
    wherein the one or more computing devices include instructions that upon execution on or across the one or more computing devices:
        initiate, based at least in part on detecting that a metric-based condition has been met, a transfer of at least a portion of contents of a first object from a first storage device of a cloud computing environment to a second storage device, independent of a client-initiated transfer request specific to the first object from a client of the cloud computing environment to which the first object belongs, wherein a difference in one or more properties between the first storage device and the second storage device provides a benefit of transferring the at least a portion of contents of the first object from the first storage device to the second storage device;
        determine, based at least in part on a particular property of the first storage device, that storage space which was being used for the portion of contents at the first storage device prior to the transfer should be used to store a second object; and
        store the second object in the storage space.

9. The system as recited in claim 8, wherein the first object comprises a file system object.

10. The system as recited in claim 8, wherein an object stored at the first storage device can be accessed at a first speed, wherein an object stored at the second storage device can be accessed at a second speed, and wherein the first speed differs from the second speed.

11. The system as recited in claim 8, wherein the benefit is that a cost of storing the first object on the second storage device is less that a cost of storing the first object on the first storage device.

12. The system as recited in claim 8, wherein the one or more computing devices include further instructions that upon execution on or across the one or more computing devices:
    collect one or more metrics associated with the first object, wherein said detecting that the metric-based condition has been met is based at least in part on analysis of the one or more metrics, and wherein the one or more metrics include one or more of: (a) a frequency with which the first object is read or (b) a frequency with which the first object is written.

13. The system as recited in claim 8, wherein the particular property comprises a speed with which objects can be accessed from the first storage device.

14. The system as recited in claim 8, wherein the one or more computing devices include further instructions that upon execution on or across the one or more computing devices:
    transfer the portion of contents of the first object back to the first storage device from the second storage device, independent of a client-initiated transfer request specific to the first object from the client.

15. One or more non-transitory computer-accessible storage media storing program instructions that when executed on or across one or more processors:
    initiate, based at least in part on detecting that a metric-based condition has been met, a transfer of at least a portion of contents of a first object from a first storage device of a cloud computing environment to a second storage device, independent of a client-initiated transfer request specific to the first object from a client of the cloud computing environment to which the first object belongs, wherein a difference in one or more properties between the first storage device and the second storage device provides a benefit of transferring the at least a portion of contents of the first object from the first storage device to the second storage device;
    determine, based at least in part on a particular property of the first storage device, that storage space which was being used for the portion of contents at the first storage device prior to the transfer should be used to store a second object; and
    store the second object in the storage space.

16. The one or more non-transitory computer-accessible storage media as recited in claim 15, wherein the first object comprises a file system object.

17. The one or more non-transitory computer-accessible storage media as recited in claim 15, wherein an object stored at the first storage device can be accessed at a first speed, wherein an object stored at the second storage device can be accessed at a second speed, and wherein the first speed differs from the second speed.

18. The one or more non-transitory computer-accessible storage media as recited in claim 15, wherein the benefit is that a cost of storing the first object on the second storage device is less that a cost of storing the first object on the first storage device.

19. The one or more non-transitory computer-accessible storage media as recited in claim 15, storing further program instructions that when executed on or across the one or more processors:
    collect one or more metrics associated with the first object, wherein said detecting that the metric-based condition has been met is based at least in part on analysis of the one or more metrics, and wherein the one or more metrics include one or more of: (a) a frequency with which the first object is read or (b) a frequency with which the first object is written.

20. The one or more non-transitory computer-accessible storage media as recited in claim 15, storing further program instructions that when executed on or across the one or more processors:
  transfer the portion of contents of the first object back to the first storage device from the second storage device, independent of a client-initiated transfer request specific to the first object from the client.

* * * * *